(No Model.) 2 Sheets—Sheet 1.

E. P. THOMPSON.
APPARATUS FOR THE SEPARATION OF GOLD FROM ITS ORES BY ELECTRO CHLORINATION AND DEPOSITION.

No. 317,245. Patented May 5, 1885.

WITNESSES

INVENTOR
Edward P. Thompson.
By his Attorneys (No Model.) 2 Sheets—Sheet 2.

E. P. THOMPSON.
APPARATUS FOR THE SEPARATION OF GOLD FROM ITS ORES BY ELECTRO CHLORINATION AND DEPOSITION.

No. 317,245. Patented May 5, 1885.

WITNESSES
Wm A. Skinkle
Francis D. Shoemaker

INVENTOR
Edward P. Thompson

By his Attorneys
Pope Edgecomb & Butler

UNITED STATES PATENT OFFICE.

EDWARD P. THOMPSON, OF ELIZABETH, NEW JERSEY, ASSIGNOR OF THREE-FOURTHS TO EDWARD P. ROBERTS AND G. H. PIERCE, BOTH OF CHEYENNE, WYOMING TERRITORY.

APPARATUS FOR THE SEPARATION OF GOLD FROM ITS ORES BY ELECTRO CHLORINATION AND DEPOSITION.

SPECIFICATION forming part of Letters Patent No. 317,245, dated May 5, 1885.

Application filed December 3, 1883. (No model.)

*To all whom it may concern:*

Be it known that I, EDWARD P. THOMPSON, a citizen of the United States, residing in Elizabeth, in the county of Union and State of New Jersey, have invented a certain new and useful Process of and Apparatus for the Separation of Gold from its Ores by Electro Chlorination and Deposition, of which the following is a specification.

The object of this invention is the separation of gold from its ores or from any of the compounds of gold which may be reduced to chlorides by the action of chlorine, the paramount step in the process being that in which the gold is dissolved by means of chlorine that has been liberated from its compounds by the action of electricity.

The process which is the subject of this invention consists of four distinct steps or sub-processes, which may be briefly stated as follows:

First. The liberation of chlorine from its compounds by electrolytic action. In the following specification a convenient and economical method of thus obtaining chlorine in the quantities required to carry out the invention is described, and other available methods briefly alluded to.

Second. Dissolving the gold from its ores or compounds by means of chlorine which has thus been liberated by the action of the electric current. Trichloride of gold (auric trichloride) is formed by this step of the process.

Third. The deposition of metallic gold from its trichloride upon charcoal or carbon used as the cathode of a second battery. This step of the process is aided in its operation by the chemical affinity between the gold and the carbon of the cathode, so that the deposition is carried forward by the forces both of electrolytic action and of ordinary chemical affinity.

Fourth. The separation of the gold from the carbon by the application of heat.

The several steps will be fully explained and illustrated by reference to the accompanying drawings, in which—

Figure 1:
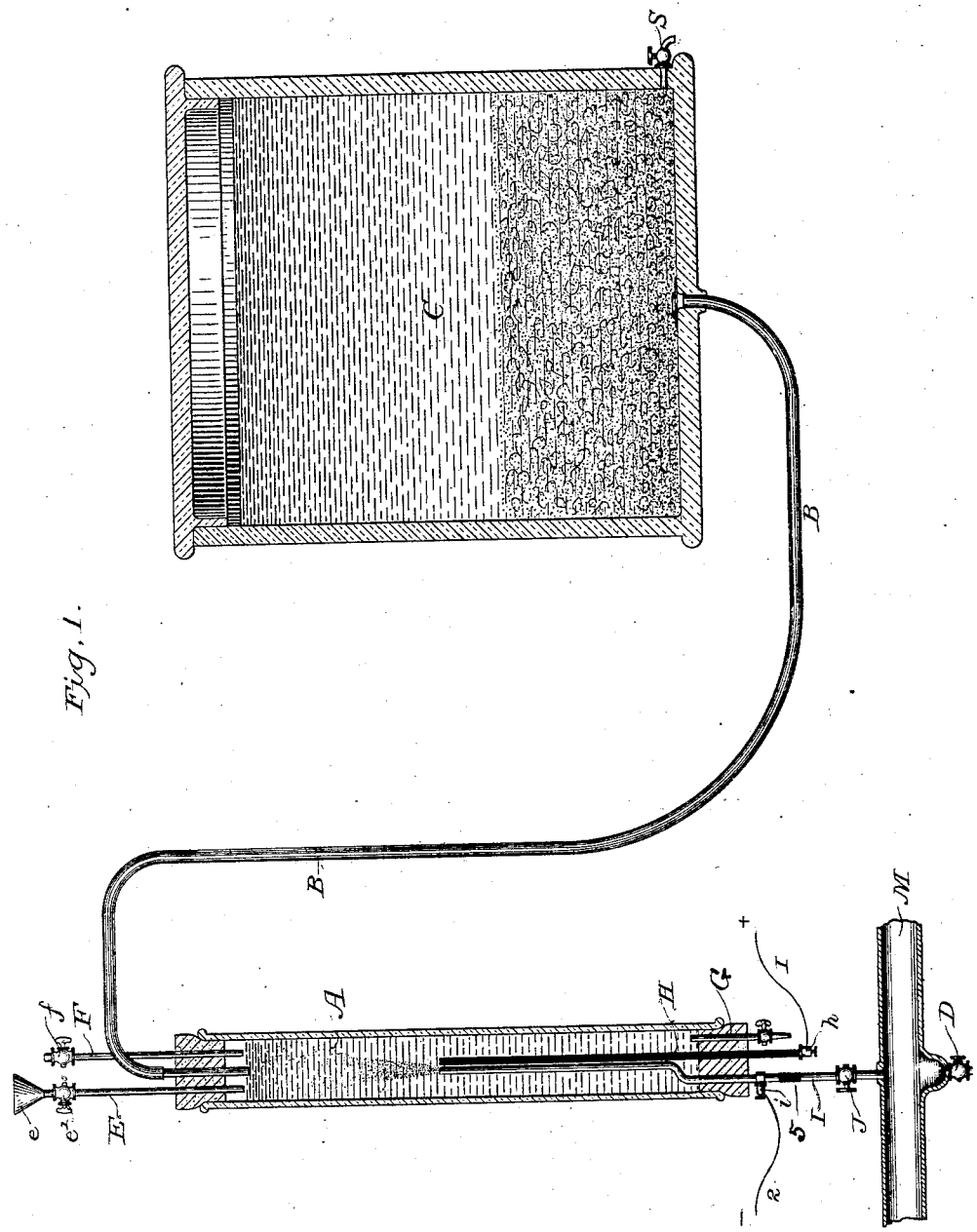
Figure 2:
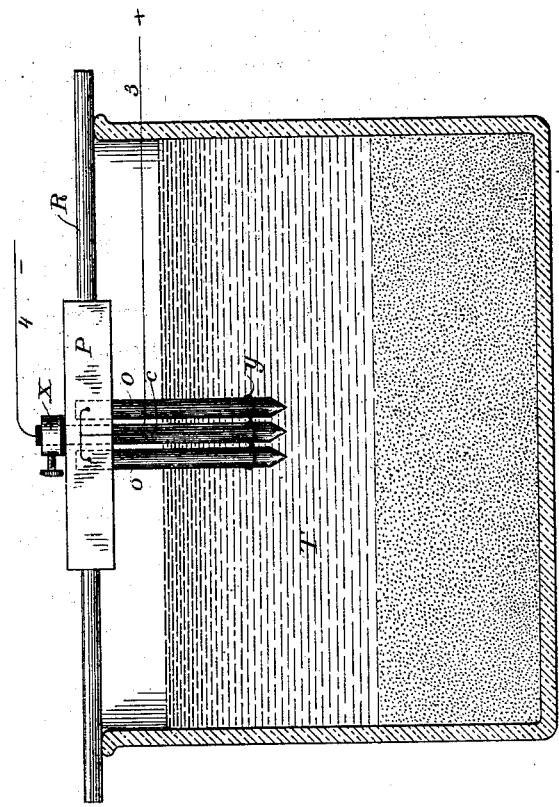

Figure 1 is a view of the chlorine-generator, the tank in which the chlorine and gold are caused to unite, and the pipe or tube connecting them. Fig. 2 is a view of the tank in which the deposition of the gold is conducted, showing the arrangement of the electrodes.

The first step of this process—the liberation of chlorine from its compounds by means of electricity—will be described with reference to the method which has been thus far found most convenient and economical. The principle upon which this step of the process depends is as follows: When a current of electricity is transmitted through a solution of common salt to which a small quantity of acid has been added, the chlorine of the sodic chloride is set free in abundance. So long as the solution remains neutral or alkaline, as in case no acid is added, no chlorine will be liberated by the current. Only a very small quantity of acid need be added to effect the change. The explanation of this is, the current forms in the neutral solution sodic hypochlorite. The same chemical compound is formed in the solution after the acid has been added; but under these conditions it is immediately converted by the electric current into its constituents, resulting in the liberation of the chlorine. In practice it is found that by adding only two or three drops of hydrochloric acid, which is the acid that has been found preferable for this purpose, to the solution of the sodic chloride and passing the electric current therethrough, the chlorine continues to be liberated until the salt is entirely decomposed. The chlorine thus obtained is used in the second step of the process to dissolve gold from its ores or compounds which have been reduced for the purpose to a finely-divided state.

A special reason for conducting this first step of the process separately is that heat, which greatly assists the liberation of the chlorine, may be applied in the operation. By this means it becomes both practicable and economical, for if the electrolyte which is employed in the liberation of chlorine be heated independently of the action of the electric current results very favorable to the operation follow. The molecules of the electrolyte will be forced into very rapid circulation, and this will to a very great extent prevent the polarization of the electrodes. As polarization is simply the collection of gas upon the electrodes, which condition causes an increased resistance to the passage of the electric current, it is evident that if these gases are removed by the action of heat as fast as they are formed the resistance of the electrolytic cell will be reduced to a minimum, and the advantages will be manifested in the liberation of the largest possible amount of chlorine. It is evident that the electrolyte might be heated by the current itself; but the expense of producing a current of the strength required for that purpose would be much greater than that of supplying the heat from some other source, such as steam or a sand bath. Again, it is well known that heat promotes chemical action, and it is evident that the electrolyte under these circumstances will be more rapidly decomposed than without heat under the same conditions. An illustration of this fact is found in the conversion of silver into its chloride. If certain ores of silver and common salt are mixed together, no action will take place, but if this mixture be heated in a proper furnace the silver will quickly unite with the chlorine, showing that the operation of heating the chloride of sodium in the presence of the metal dissociates the chlorine from its union with the sodium. Again, as the chlorine is drawn away from the electrolytic cell and conducted into the tank or vessel in which the second step of the process is to be conducted, the heat will greatly assist in conducting it away, because the heated electrolytic liquid will hold in solution very much less of the chlorine than would be retained by a cold liquid. The mechanical agitation or circulation of the liquid caused by heat will serve to drive the chlorine from the generator through its conducting-tube to the tank, where it is to be used, more rapidly than it would otherwise pass. An illustration of this principle is found in the case of water, which always in its natural state contains more or less air in a chemically free state. If the water is heated, the air will be almost completely expelled. It is therefore in every way desirable to supply heat to the secondary cell in which the chlorine is set free. In practice it is found that a very simple and convenient means for applying the requisite amount of heat to the cell is to introduce steam through a small pipe, which pipe may itself constitute the cathode of the cell, thereby being made to perform two functions.

A second reason for separating the chlorine from its compounds in a separate vessel from that in which the gold ore is treated is the following: When the ores which are to be treated have been previously prepared by roasting, there will always remain a greater or less amount of sulphur in the form of a sulphuret or a sulphide. During the process of separating the chlorine from its compounds there is formed a quantity of hydrochloric acid. If these two compounds be present when the gold ore is being treated by electrolysis, sulphureted hydrogen will be formed, and this acts as a reagent, precipitating a disulphide of gold. By leading the chlorine into a separate vessel and then performing the second step of the process not only does the chlorine retain the superior qualities which it acquires for attacking the gold by reason of having been liberated by electrolysis, but the hydrochloric acid is eliminated, and even though the sulphur compounds be present in the ore the sulphur will not be converted into such form that it will attack the gold compounds. A third reason is that in this process if the chlorine were generated in the vessel which contains the ore, the gold would be electroplated upon the steam-pipe cathode. The inconvenience of such a result is apparent.

In thus making an ordinary steam-pipe the cathode of the secondary cell in which the chlorine is to be generated advantage is taken of the law or principle that a gas or acid which is set free at the anode of a secondary cell will not attack and combine with the cathode of the cell. In accordance with this law or principle the chlorine which is set free at the anode of the secondary cell or "chlorine-generator," as it may be called, which under other circumstances would rapidly attack and corrode the iron pipe which, as in this case, made the cathode of the cell, will not, under the conditions stated, unite with or corrode it. The pipe remains clean, and performs its office of cathode without interference from any corrosive action. The reason is this, so long as the current passes hydrogen and sodic hydrate are liberated at the surface of the pipe, and neither of these will attack metals. Chlorine, on the other hand, is being liberated at the anode, and as chlorine attacks all metals it is evident that the anode must be non-metallic. An illustration of the same principle is found in the electro-deposition of copper from the sulphate of copper. In this operation sulphuric acid is liberated at the anode, and yet it does not attack and dissolve the copper which is deposited or electroplated upon the cathode, which it would do if no current were passing.

In order to determine the size of the apparatus necessary to be provided for carrying on the process which constitutes this step of the invention, it is easy to experimentally determine what quantity of salt is required to reduce a given quantity of the trichloride of gold, the formation of which constitutes the second step in the process. In practice it is found that the proportion, by weight, of the sodic chloride required to form the auric trichloride is as five to one—that is to say, the chlorine in five pounds of the former will unite with so much gold as to produce one pound of the latter; or, in other words, five pounds of common salt will produce one pound of the trichloride of gold.

It now remains only to describe apparatus by means of which the first step of the process may be conveniently carried out.

Referring to the drawings, Fig. 1 represents the chlorine-generator, the tank or vessel designed to contain the trichloride of gold, and the pipe or tube connecting the two.

In the figure, A represents a glass tube closed at each end by tightly-fitting corks. Through the upper end pass three glass tubes. To the middle of these tubes is attached the flexible tube or pipe B leading to the tank C. This tube conveys away the chlorine as fast as it is generated to the tank C, which contains gold ore and water. The tube E, which is provided with a funnel-shaped top, $e$, enters the upper end of the tube A, allows the salt-water, which has been rendered slightly acidulated by means of the hydrochloric acid, to be poured into the tube A until it is nearly filled. The stop-cock $e'$ closes the tube E after a sufficient quantity of the solution has been poured in. The tube F is allowed to remain open while the solution is being poured into the tube A, and is afterward closed by the stop-cock $f$. The lower end of the tube A has also three holes. The small tube G, which enters the tube A through one of these holes, allows the liquid to be drawn off when desired. The two electrodes pass through the other two holes. The anode H is a carbon rod, to which the conductor 1, leading from the positive pole of the battery O, is electrically connected by the binding-post $h$. The cathode I consists of an ordinary metallic steam-pipe of small size, to which the wire 2, leading from the negative pole of the battery O, is connected by the binding-post $i$. The pipe or cathode I communicates with the main steam-pipe M; but is insulated therefrom by the section 5, of rubber or other suitable material. The steam may be allowed to pass from the main steam-pipe into the tube A by means of a valve, J. Water arising from the condensation of steam may be blown off at D. The two electrodes pass into the interior of the tube A and extend through about one-half its length, and are placed close together, as shown in the figure, so that the resistance of the electrolyte shall be as small as possible. When a current of electricity is allowed to pass from the positive to the negative pole through the solution, and the valve J is opened slightly to allow steam to enter through the pipe I, which forms the cathode, chlorine is very rapidly liberated, which will, as already shown, pass through the central tube at the upper end of the large tube A, and through the pipe B into the tank C.

The method which has been described of obtaining chlorine in sufficiently large quantities to carry out the invention is one that has been found economical and convenient in practice; but there are other ways of liberating chlorine by electricity which could equally well be used as the first step in carrying out the invention. One very excellent way of thus obtaining chlorine is the following: Let a supersaturated solution of chloride of lead be put into the electrochlorine-generator already described. Let an anode of carbon be used as before, and let the cathode be a lead plate. When the current is passed therethrough, chlorine is liberated at the carbon anode in the same manner as has already been described with reference to the sodic-chloride solution, and will pass into the vessel C through the pipe D. At the same time the lead will be deposited in a pure state upon the lead plate which forms the cathode in the form of fern-like crystals of bright metal. The lead is thus separated from its compound by the action of the electric current, and at the same time the chlorine is liberated, and this may be used for the purpose of dissolving the gold in precisely the same way as the chlorine which has been obtained from the solution of common salt may be used.

In regard to this latter method of obtaining chlorine, it may be said that the chloride of lead is only slightly soluble, which fact might at first appear to be an objection to this method; but it is also true that lead will precipitate or deposit from a weak solution of chloride of lead nearly as well as it will from the solution of any salt of lead, and as rapidly as the small amount of dissolved chloride of lead is used up by the electrolytic action of the cell in the above operation just so fast will more chloride of lead pass into solution and thus maintain the supply for the continual action of the current. It is for this reason that a supersaturated solution of the lead chloride is preferably employed.

One other method of obtaining chlorine through the action of electricity may be mentioned, which is by the use of bleaching-powder. This substance contains chlorine in the form of calcic hypochlorite, from which the chlorine may be readily liberated by the addition of an acid, leaving the chloride of lime. The acid unaided will not break up this compound, and therefore no more chlorine will be liberated. If, however, a current of electricity is passed through the solution, more calcic hypochlorite will be formed thereby, and the acid being present more chlorine will be liberated. In this manner all the chlorine may be driven from the bleaching-powder.

Upon principles similar to those availed of in the method already described chlorine may be set free from nearly all compounds into which it enters. The decomposing action of the electric current may be applied not only to simple or even double chlorides, but extends to cases where other compounds are present, and together form the chloride from which the free gas is to be obtained. An illustration may be found in the dissolving of salt in dilute sulphuric acid. The chemical action which takes place produces sodic sulphate and hydrochloric acid. With a battery having an electro-motive force exceeding one volt the chlorine may be driven from the hydrochloric acid, even in the presence of the sodic sulphate.

The first step in the process which constitutes this invention being therefore the liberation of chlorine by the action of electricity, and as this step may be carried out in several ways, the invention is not confined, so far as this step is concerned, to any one method of obtaining this element.

The second step in the process which constitutes this invention consists in bringing the chlorine that has thus been obtained through the action of electricity into intimate contact with the gold, with which it unites, forming trichloride of gold.

The principles upon which the operation of this second step in the process depends are these: First, when an element has been driven from its compounds by electrolytic action, it possesses a stronger chemical affinity for other elements than when it is otherwise separated from those compounds; second, one of the special characteristics of chlorine is its solubility in water; and, third, chlorine will unite with gold, forming therewith a soluble compound wherever the two are brought in contact with one another.

In the practical application of these principles the chlorine which has been liberated in the generator is allowed to diffuse itself through a considerable body of water contained in a tank which also contains gold ore, and the two elements quickly unite, forming the auric trichloride, as described. It is believed that this invention first makes use of chlorine that has been liberated from its compounds by electricity for the purpose of separating gold from its ores or compounds. The superior state or condition of the properties of the chlorine thus liberated is an important factor in the successful practical use of the invention. In practice the tank in which this operation takes place is about half filled with the finely-ground ore, and is then nearly filled with water.

Referring again to the drawings, the tank C is provided with a stop-cock, S. When the liquid in the tank has become quite yellow, it may be considered sufficiently rich in trichloride of gold, and may be drawn off into any reservoir provided for the purpose, and in which the third step in the process may be conducted. The solution thus drawn off is that of trichloride of gold in water. The tank C should not be made of metal, inasmuch as chlorine attacks other metals as well as gold, but of wood or glass, these materials having been found preferable in practice. Experiments made with metallic tanks, and especially tanks of lead, prove that such may be made to answer the purpose very well, provided the exposed surface be covered with paraffine, pitch, asphaltum, or some similar material which will not be acted upon by chlorine.

As this second step of the process consists in forming a union between chlorine that has been liberated by the action of electricity and gold, and as the operation does not depend for its results upon any special form of apparatus, the invention is not therefore confined so far as this step is concerned, to the form of apparatus which has herein been described.

The third step in the process consists in the deposition of the gold from the trichloride solution upon charcoal or carbon, which is used as the cathode of a second battery. This step of the process is aided in its operation by the chemical affinity of the gold and the carbon which forms the cathode, so that the deposition is carried forward by the forces both of electrolytic action and of chemical affinity. There are several methods of depositing gold from its chloride, but for the purposes of this invention it is preferred to use that which has just been named.

The principles that underlie this step of the process are as follows: First, a solution of chloric trichloride under the action of electrolysis will give a deposit of gold upon the cathode of the electrolytic cell; second, charcoal immersed in a solution of auric trichloride will become coated with gold. As has already been said, a combination of these two principles is employed in carrying out this step of the process. It is believed that charcoal or carbon has not heretofore been used as the cathode of a second cell for the purpose of obtaining the electro-deposition of gold.

The operation is as follows: When the electric current is passed through the solution of the auric trichloride used as an electrolyte, the compound is decomposed, chlorine is liberated at the anode and gold at the cathode. When the charcoal or carbon is simply immersed in the aqueous solution of auric trichloride without the aid of the current, the great affinity of hydrogen for chlorine causes those two elements to unite—the chlorine of the auric trichloride and the hydrogen of the water—while the gold is left free upon the surface of the carbon. The reactions in this case do not interfere with the process of electrolysis. The two take place simultaneously, and thus make the action double—that is, gold is deposited by means of two forces—electrical energy and the chemical affinity of chlorine and hydrogen. It may be briefly stated in this way that gold is deposited by two well-known processes—electrolysis and simple immersion.

It would be practicable to conduct this third step of the process in the same tank or vessel which served for the second step; but it is preferred to conduct the steps separately. The yellow liquid, therefore, which forms the solution of trichloride of gold having been drawn off from the tank in which that compound was formed, is used in another and similar tank as an electrolyte, while carbon rods are used for the electrodes, both positive and negative.

Metal might be used for the cathode in place of the carbon; but in order to carry out the fourth and last step of the process properly carbon has been found to be preferable.

Fig. 2 is a view of the tank in which the deposition of the gold is conducted, showing the arrangement of the electrodes. In this figure, T is the tank, which is filled with the solution drawn from the tank C, Fig. 1, and partly filled with the gold sand. $o\ o$ are the carbons, which are electrically connected and form the anode, and $c$ is the carbon which forms the cathode. The three carbons are supported by a non-conducting block of hard wood, P, secured to the rod R, which latter rests upon the upper edge of the tank. Thus the electrodes are held suspended in the clear liquid that fills the tank. The two carbons $o\ o$ are secured tightly to the block P, and are electrically united with each other and with the wire 3, leading from the positive pole of the battery. The carbon $c$, forming the cathode, is loosely held in the block P, the binding-clamp X serving to hold it in place and to connect it with the negative pole of the battery by means of a wire, 4. The three carbons are placed as closely together as possible, and in order to prevent their coming in contact an elastic band, $y$, is twisted about them in such a manner as to keep them separate. There are many methods of arranging these electrodes, of clamping them together, and insulating them from each other; but the method described is found to answer well in practice. When a current is passed from the positive to the negative pole through the solution of auric trichloride, the gold is rapidly deposited upon the cathode, as has already been described. At this point of the operation a principle is taken advantage of which has an important bearing upon the successful carrying out of the invention. When chloride of gold is decomposed by the electric current, hydrogen and gold are liberated at the cathode and chlorine and oxygen at the anode. The process, it will be seen, is the reverse of that of dissolving gold and chlorine. In the one case the two elements are united, in the other they are separated. If the chlorine that is thus set free at the anode of the electrolytic cell is prevented from escaping and again is used, it is evident that the process will be much more economical. Taking advantage, therefore, of the fact that chlorine will attack gold whenever the two elements are brought in contact, there is placed in the tank in which this third step of the process is conducted a quantity of finely-pulverized gold ore or gold sand. It may either be placed free in the bottom of the tank, or it may be suspended in any part thereof in a cloth sack or perforated vessel. Under these conditions the chlorine that is set free at the anode is made available for the purpose of dissolving more gold. It will now be understood that the current is required to perform almost no other work than that of overcoming the resistance of the electrolyte, as nearly the same amount of energy as is expended in decomposing the auric trichloride is recovered by the uniting of the chlorine with the free gold, placed for the purpose in the cell, thereby forming more auric trichloride; or, in other words, the electric energy expended in decomposing the chloride is reproduced to the same extent when the liberated chlorine unites with the free gold.

In carrying out this step of the process certain conditions are necessary to be observed. A large quantity of the solution of the trichloride should be provided; also a considerable excess of free gold in the tank containing the solution, while the electrodes should be comparatively small. The large-sized carbons used for electric-arc lamps are found to answer admirably for this purpose. The reason for the above is that when the electrodes are small and the solution large in quantity the amount of chlorine set free is comparatively small, and it is therefore distributed throughout the mass of liquid and ore almost instantly. The tendency of the chlorine to escape into the air is not great, unless the solution is near saturation. There is no waste of chlorine or of electric energy. The rapid diffusion of the chlorine prevents the polarization of the electrodes, thus keeping the internal resistance of the cell at a minimum. The tank or cell should not be exposed to the light, because light will cause the hydrogen of the water and the chlorine to unite, thus causing a useless waste of electric energy, for when the hydrogen and the chlorine thus unite hydrochloric acid will be the result, and this will be required to be decomposed again by the current, together with the auric trichloride, in proportion to their electro-chemical equivalents, thus setting free the chlorine again to attack the gold.

As this third step of the process consists in the deposition of gold from its combination with chlorine in aqueous solution, and as no special form of apparatus is necessary to the operation, therefore the invention is not confined, so far as this step is concerned, to the form of apparatus herein described.

The fourth step in this process consists of separating the gold from the carbon, upon the surface of which it has been deposited by the operations constituting the third step of the process.

The simple principle upon which this step is founded is that the gold is fusible, while carbon is not. Therefore by putting the gold and carbon into a crucible and subjecting the latter to a very high temperature, care being taken that the contents are kept out of contact with air, the gold will melt into a button or nugget, while the carbon will retain its form and properties, and may be used over again indefinitely. It now becomes evident why it is preferable to use carbon as the cathode of the electrolytic cell in the third step of the process, the object being to enable the gold to be separated from the electrode by the simple process of heat. This purpose also sufficiently distinguishes the third step of the process from the ordinary operation of electroplating or electro-gilding. These ordinary operations have for their object the covering of baser metals with a thin film of bright gold for the purpose of protecting them from corroding or other influences to which they are to be subjected in ordinary use, thus making the articles formed of the baser metals more ornamental and valuable. It is evident that for the extraction of gold which is to be used commercially carbon as a cathode has great advantage over metals used for that purpose. These advantages have already appeared from the foregoing description—namely, the carbon has an inherent and natural property of separating gold from its solutions, and this is aided in the process herein described. Further, the metal may be separated from the carbon by heat alone. In carrying out the process, therefore, after the carbon cathode c in Fig. 2 has been coated with gold it is lifted from the solution by taking hold of the clamp X, the hole in the block P being large enough to admit of its ready removal. Another carbon is then attached to the clamp and is put in place, and the process thus may be repeated until a number of carbons upon which the gold has been deposited are ready for the fourth step of the process. The carbons are then packed in fine charcoal in a crucible. The cover is luted to the crucible and the whole subjected to a high temperature in a suitable furnace, whereby the gold is melted and forms a nugget in the bottom of the crucible, while the carbon rods remain unchanged.

It will be observed that as chlorine attacks all metals forming chlorides therewith, it will unite with any other metals that may be present in the ore, as well as with the gold, and in the tank therefore (shown in Fig. 2) there might be formed not only the auric trichloride, but also the chloride of such other metals as might be present in the ore. It is, however, well known that under the circumstances in which the third step of the process is carried on gold will be first deposited upon the carbons, and the other metals will not be deposited upon them so long as gold is present. As has already been described, gold is kept constantly present in the tank, and therefore very little, if any, other metal will be deposited with the gold upon the cathode. It is evident that if other metals are deposited they will be melted, together with the gold, by the heat made use of in the fourth step of the process, and the gold will therefore require to be refined, which may be done by any of the usual processes.

It is evident that the process of separating gold from its ores herein described, and which constitutes this invention, is a very economical and convenient one. As has been shown, five pounds of common salt will produce one pound of the trichloride of gold, and the same chlorine may be used over again in the manufacture of more trichloride. Only one chemical is used—namely, common salt—which is one of the cheapest and most easily obtained of all substances. The amount of hydrochloric acid required to be added is but a few drops per hundred pounds of the salt, and will therefore be inappreciable as an element of cost. No other chemical is used at any stage of the process. The apparatus required is very simple and inexpensive, and the process requires very little superintendence or any labor, so that it may continue night and day on a large scale with very little cost of attendance.

The electricity may be supplied from a dynamo-electric machine, which may be placed at any convenient point and the electrical energy conveyed to the apparatus by means of wires.

The apparatus is easily removed, and in mining countries may be transported to points most convenient for its use at a slight cost.

I claim as my invention—

The combination, with an electrolytic cell for separating chlorine from its compounds and its anode, of a battery, a cathode consisting of a pipe through which steam is admitted to the cell for the purpose of increasing the rapidity of the separation, and conductors respectively connecting the said anode and cathode with the poles of said battery.

In testimony whereof I have hereunto subscribed my name this 27th day of November, A. D. 1883.

EDWARD P. THOMPSON.

Witnesses:
DANL. W. EDGECOMB,
CHARLES A. TERRY.